United States Patent
Sadinski

(10) Patent No.: US 6,403,016 B1
(45) Date of Patent: Jun. 11, 2002

(54) VACUUM EXTRUSION SYSTEM AND METHOD

(75) Inventor: Robert L. Sadinski, Tallmadge, OH (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

(21) Appl. No.: 09/470,918

(22) Filed: Dec. 23, 1999

Related U.S. Application Data

(63) Continuation of application No. 08/916,185, filed on Aug. 21, 1997, now Pat. No. 6,036,468.

(51) Int. Cl.⁷ ............................................... B29C 47/88
(52) U.S. Cl. ...................... 264/560; 264/562; 264/101; 264/178 R; 264/210.2; 425/188
(58) Field of Search .................................. 264/560, 562, 264/101, 178 R, 210.2; 425/186, 188, 71.73, 388, 326.1

(56) References Cited

U.S. PATENT DOCUMENTS

| | | |
|---|---|---|
| 1,990,434 A | 2/1935 | Kohler |
| 2,987,768 A | 6/1961 | Given |
| 3,295,163 A | 1/1967 | Bachus |
| 3,378,887 A | 4/1968 | Reib et al. |
| 3,428,726 A | 2/1969 | Moss |
| 3,558,753 A | 1/1971 | Edlin |
| 3,584,108 A | 6/1971 | Nelson et al. |
| 3,704,083 A | 11/1972 | Phipps |
| 3,822,331 A | 7/1974 | Cogliano |
| 4,044,084 A | 8/1977 | Phipps |
| 4,199,310 A | 4/1980 | Phipps |
| 4,211,739 A | 7/1980 | Phipps |
| 4,234,529 A | 11/1980 | Phipps |
| 4,247,276 A | 1/1981 | Phipps |
| 4,271,107 A | 6/1981 | Phipps |
| 4,371,488 A | 2/1983 | Phipps et al. |
| 4,395,214 A | 7/1983 | Phipps et al. |
| 4,445,837 A | 5/1984 | Cisar et al. |
| 4,454,082 A | 6/1984 | Cisar et al. |
| 4,469,652 A | 9/1984 | Cisar et al. |
| 4,486,369 A | 12/1984 | Schafler et al. |
| 4,487,731 A | 12/1984 | Kobayashi |
| 4,585,603 A | 4/1986 | Furuta et al. |
| 4,626,183 A | 12/1986 | Shirai et al. |
| 4,783,291 A | 11/1988 | Pagan |
| 5,120,481 A | 6/1992 | Brackman et al. |
| 5,236,325 A | 8/1993 | Groblacher et al. |
| 5,340,295 A | 8/1994 | Preiato et al. |
| 5,346,379 A | 9/1994 | Wolfl et al. |
| 5,753,161 A | 5/1998 | Lightle et al. |
| 6,036,468 A * | 3/2000 | Sadinski ................ 425/186 |

FOREIGN PATENT DOCUMENTS

| | | |
|---|---|---|
| EP | 0260948 | 3/1988 |
| EP | 0260949 | 3/1988 |

* cited by examiner

*Primary Examiner*—Mark Eashoo
(74) *Attorney, Agent, or Firm*—Inger H. Eckert; Stephen W. Barns

(57) ABSTRACT

A vacuum extrusion line of the horizontal barometric leg type includes a vacuum chamber having an extrusion die at one end and a water baffle immersion cooler at the other end for extracting the extrudate to atmosphere, extrudate shaping and sizing equipment downstream of the die, a large diameter fixed bulkhead at the die, and first and second large diameter movable sections surrounding the shaping and sizing equipment, a smaller fixed section of the chamber. The first section sealing against the second section and the fixed section and telescoping over the fixed section to form a gap with the second section being movable within the limits of the gap. The second section also seals against the large diameter fixed bulkhead. In this manner the downstream equipment can be fully exposed by movement of one or both movable sections and adequate volume and spatial working environment is provided for large through-put. A simplified lock mechanism facilitates the quick opening and closing of the chamber.

5 Claims, 6 Drawing Sheets

VACUUM EXTRUSION SYSTEM AND METHOD

DISCLOSURE

This application is a continuation of application Ser. No. 08/916,185, filed on Aug. 21, 1997, now U.S. Pat. No. 6,036,468.

This invention relates generally as indicated to a vacuum extrusion system and method, and more particularly to certain improvements in the invention disclosed in the prior application of Roger Lightle et al. Ser. No. 08/696,472, filed Aug. 14, 1996, and entitled "Vacuum Extrusion System and Method".

BACKGROUND OF THE INVENTION

Such prior application discloses a horizontal barometric leg of the type shown in Pagan U.S. Pat. No. 4,783,291. In the Pagan patent, a vacuum chamber includes an extrusion die at one end forming an extrudate. After passing through sizing, calibration and draw off equipment, for example, the extrudate exits the vacuum chamber through a water baffle. The extrudate passes over a dam and dips into a pond to exit the chamber through the pond. The pond has two sections or levels, one with a higher level within the chamber during vacuum and one with a lower level outside the chamber. A circulating system keeps the pond level within the chamber from overtopping the dam during vacuum extrusion. The pond provides full immersion cooling during vacuum extrusion as well as providing a continuous water baffle seal for the extrudate exiting the chamber. The extrudate may be cut and processed in atmosphere after it leaves the lower level or section of the pond outside the chamber.

In such prior Lightle, et al. application there is disclosed a horizontal barometric leg vacuum extrusion line with a support truss extending from the dam to a fixed bulkhead, the die being mounted on the end of the extruder projecting through the fixed bulkhead. Calibration and sizing or draw-off equipment is mounted on the truss.

The chamber surrounding the truss includes a fixed section and a telescoping section which can move away from the bulkhead telescoping over the fixed section to provide access to the die and the downstream equipment.

If some of the downstream equipment is within the fixed section, the fixed section is entered as one would a cave or tunnel. The system with the single movable section telescoping over the fixed section is quite adequate for medium to low through-puts, but is not necessarily adequate for large through-puts and/or extrudate cross-sections with foaming extrudates. Through-puts are normally expressed as pounds or kilograms per hour. For example, smaller through-puts typically may be two hundred pounds per hour or less, while larger through-puts may typically be two thousand pounds per hour or more.

When a mishap or mayhap occurs, especially during system start-up, the operators need to open the chamber quickly and obtain access to the errant downstream equipment quickly. The operators not only need access quickly, they need access with an adequate spatial working environment. Without such, the vacuum chamber may literally fill up or start to fill up with extrudate, especially foam extrudate, requiring the whole system to be shut down.

With higher through-puts, problems need to be addressed more quickly, and the chamber of the system requires larger volume around the downstream equipment, not only to accommodate the equipment, but also operators around the equipment with adequate spatial working environment to obtain access to the equipment and any misdirected extrudate.

SUMMARY OF THE INVENTION

The vacuum chamber of the present invention utilizes a fixed large diameter entrance bulkhead plate. A first section with a large diameter is movable and seals against a second larger section, and telescopes over a smaller diameter fixed section which includes the dam and the higher level portion of the pond of the water baffle seal. The second larger section may move within the gap created by movement of the first, and seals against the first and entrance bulkhead plate. A truss supporting the downstream equipment extends from the dam to the fixed bulkhead through the movable large diameter sections. In this manner all of the downstream equipment may be mounted within the two movable large diameter sections providing adequate volume for large through-puts as well as a good spatial working environment.

Both large diameter sections may quickly be opened with the first telescoping over the smaller fixed section, and the second section may be moved with the first section or within the gap provided by the first section. In this manner any portion of the downstream equipment may quickly be completely exposed.

The first section may be locked to the fixed section, and fluid seals may be employed between the bulkhead and second section, the first and second section, and the first section and fixed section, quickly to reestablish the integrity of the vacuum chamber. Both larger diameter sections may be power operated to move concurrently or independently.

In order to achieve quick access and to open and lock the vacuum chamber, there is provided a simplified quick acting preferred lock system between the fixed and a moving section of the vacuum chamber. The lock system utilizes pneumatic piston-cylinder assemblies driving lock blocks behind fixed stop blocks, forcing the sections together in a direction opposite the forces generated by the fluid seals. The preferred lock system may be utilized whether the fixed and moving sections are substantially the same size or substantially different in size.

To the accomplishment of the foregoing and related ends, the invention then comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE ILLUSTRATED PREFERRED EMBODIMENTS

Figure 1:
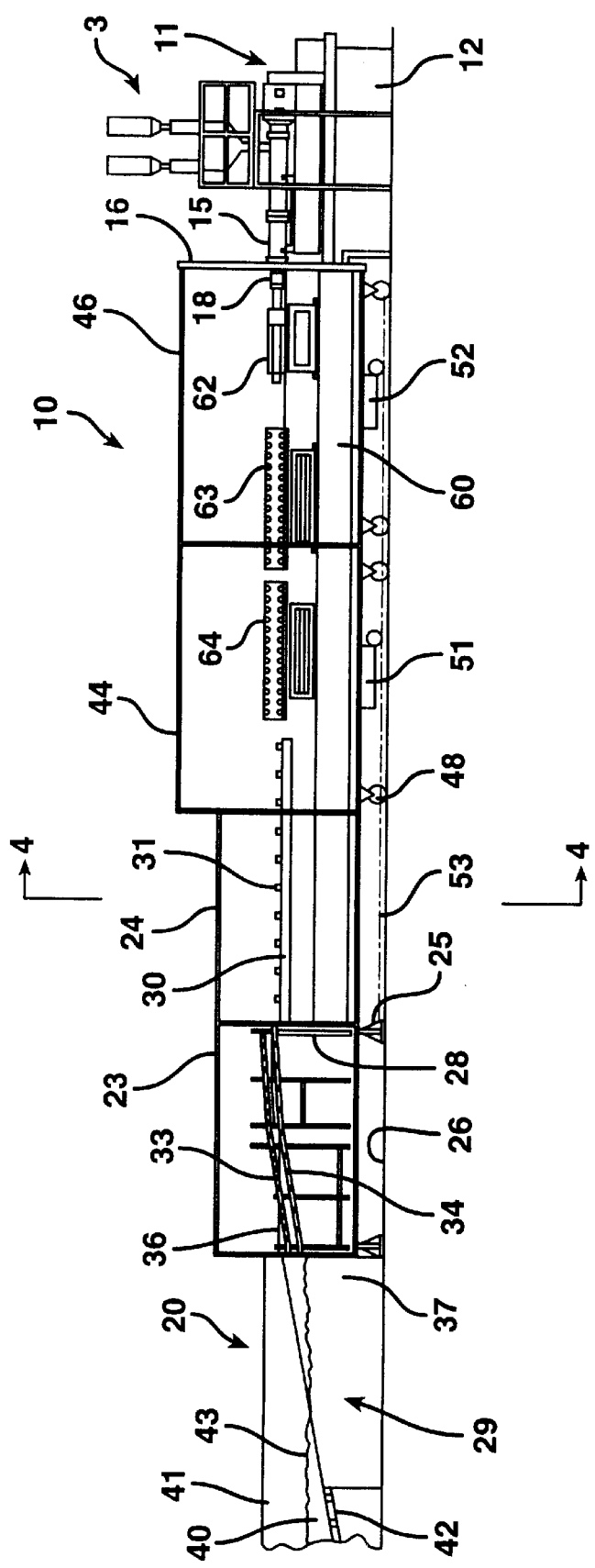
FIG. 1 is a somewhat schematic side elevation of a vacuum chamber section of a foam extrusion line in accordance with the invention with the chamber fully closed.
Figure 2:
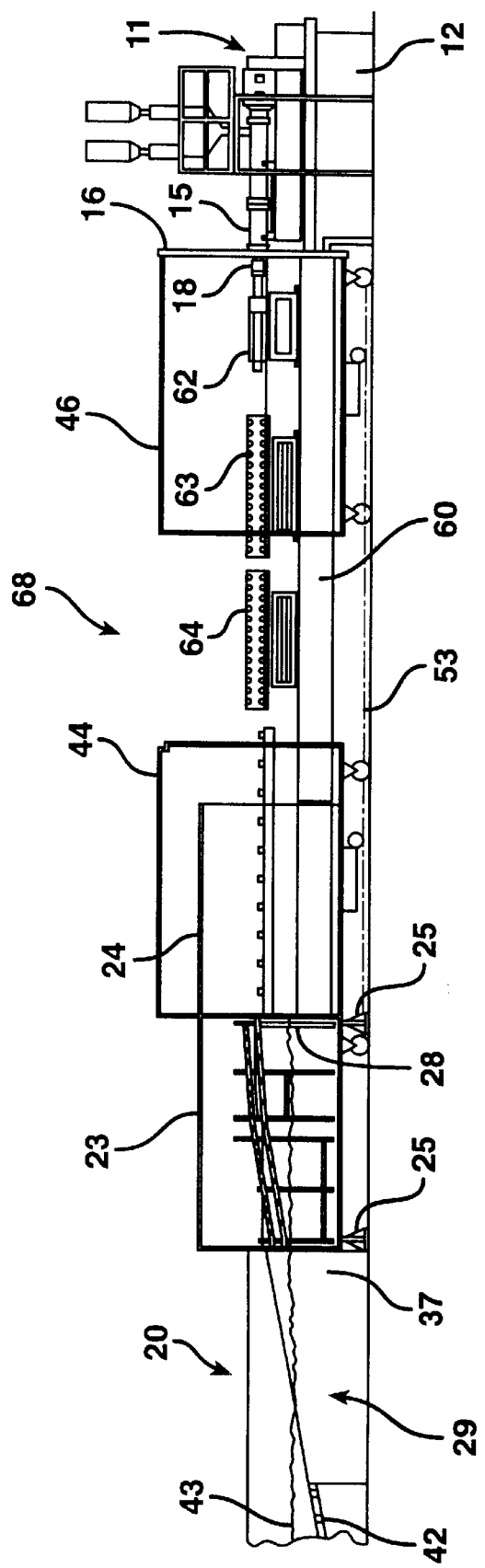
FIG. 2 is a similar schematic showing one enlarged section opened and telescoped to expose some of the take-off equipment.
Figure 3:
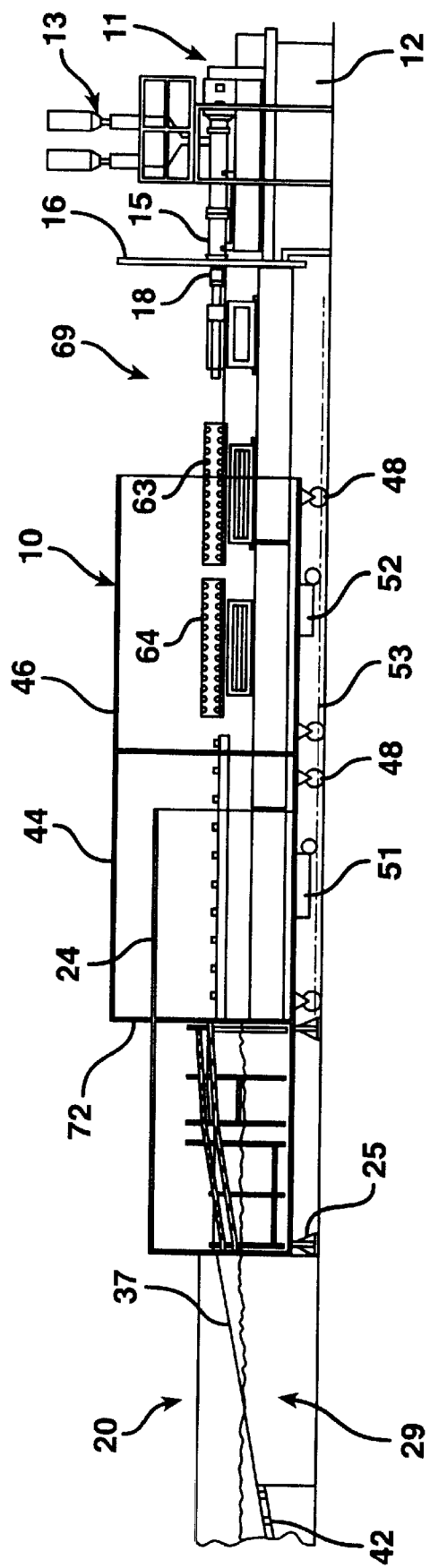
FIG. 3 is a similar schematic showing a second enlarged section open and shifted with the one to expose some of the take-off, shaping or calibrating equipment and the die.

Referring now to the drawings and more particularly to FIGS. 1 through 3 the vacuum chamber section of a foam extrusion line is shown generally at 10. At the right hand or upstream end of the line there is provided one or more extruders shown generally at 11. The extruders are mounted on a stand 12 and include one or more hoppers 13 by which the raw materials are fed to the extruder barrel 15 to be formed under heat and pressure into a foamable plastic melt. An extension of the extruder barrel may project through a large diameter fixed bulkhead plate indicated at 16 with the die 18 being mounted on the end of such extension within the vacuum chamber. The extruder barrel may extend through a gland as shown in applicants' co-pending application Ser. No. 08/696,718 filed Aug. 14, 1996, and entitled "Vacuum Extrusion Apparatus and Method". The die 18 is thus within the chamber and interior of the bulkhead 16. The bulkhead forms the upstream end of the vacuum chamber 10. The opposite or downstream end is in the form of a water baffle immersion cooler shown generally at 20. The chamber at such water baffle end may include interconnected fixed cylindrical sections 23 and 24 which are mounted on fixed stanchions 25 on the floor 26. A fixed exit bulkhead in the form of a dam is provided at 28 near the joint of the two fixed sections 23 and 24, which forms a pond or reservoir 29, one end of which is in essentially all of the section 23. In the section 24 there may be provided a roller conveyer 30 having rollers 31 providing support beneath the extrudate. As the extrudate passes over the top of the dam 28, guide rollers may be provided both above and below the extrudate as indicated at 33 and 34, respectively. These conveyor rollers cause the extrudate to deflect or dip downwardly through a slight curve after having passed over the dam to enter the pond 29 of water. The level of the pond within the chamber when under vacuum is shown at 36.

The extrudate passes into a hood 37 and exits the hood beneath the section of the pond indicated at 40 exposed to atmosphere in open pond containment 41. The extrudate is still guided by the conveyor system indicated at 42 on the top of the extrudate. At this point the extrudate will float upwardly against the conveyor system. The extrudate continues through the pond section 40 and exits to atmosphere for cutting and processing. The details of the water baffle and conveyor system for removing the extrudate from the vacuum chamber to the processing point may be seen in the co-pending application of Lightle et al. noted above. Under vacuum, the level of the pond indicated at 36 is somewhat above the level 43 of the pond 29 exposed to atmosphere. The pond is kept from overtopping the dam 28 by circulating the water back to the atmospheric end of the pond. Again this is shown in the prior Lightle et al. application.

Positioned upstream of the fixed section 24 of the vacuum chamber is a substantially larger movable section shown generally at 44. A second movable section of the same larger diameter is provided at 46, and it will be noted that the fixed bulkhead 16 at the upper end of the upstream end of the chamber is of comparable diameter. Both movable sections are mounted on rollers indicated at 48, in turn mounted on tracks 49 which run parallel to the extrusion line. At least one of the tracks and mating rollers may be a guide system to maintain alignment when the sections 44 or 46 are moved. The rollers and rails are seen more clearly in FIG. 4.

Both large diameter movable sections 44 and 46 are provided with drive motors seen at 51 and 52 which may engage chains mounted on the floor indicated at 53. The drives 51 and 52 may be energized much as a garage door opener to move the large diameter sections 44 and 46 either concurrently or individually.

Extending from the dam 28 to the large diameter bulkhead 16 is a truss or beam 60. The truss may include rails serving as supports for the relatively complex equipment which is positioned downstream of the die 18 for calibration and sizing purposes. For example, the extrudate after leaving the die 18 may pass through a calibration unit 62 and a sizing or roller take-off 63, and finally a roller take-off 64. Such units are fairly complex and require, particularly at start up, adjustment and fine tuning. With the present invention access to the die, any shaping mechanism downstream of the die, and the complex calibrating and take-off equipment can be had very quickly by movement of one or both of the large diameter movable sections. The large diameter of the movable sections provides the necessary clearance for an operator working in the spatial environment of the downstream equipment or die and also provides a large volume should a foaming extrudate errantly deviate from its intended path.

Figure 4:
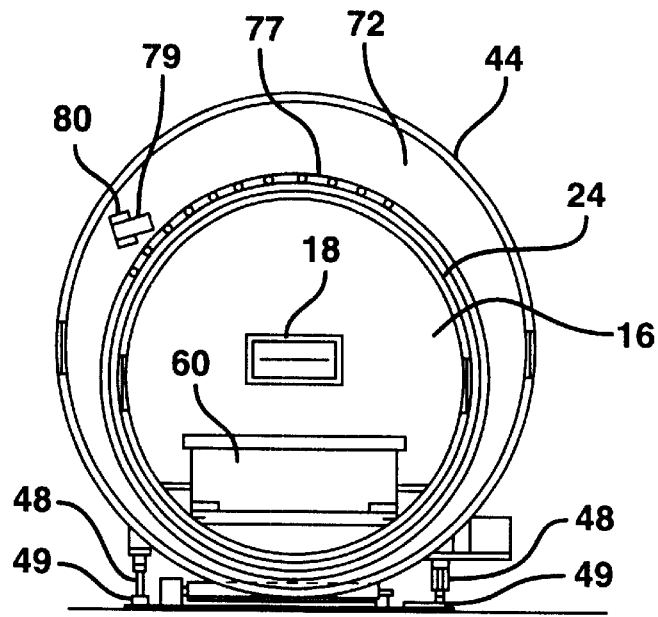
FIG. 4 is a section taken substantially on the line 4—4 of FIG. 1 showing the eccentric fixed and the larger telescoping first section.

In comparing FIGS. 1, 2 and 3 it will be seen that the first movable enlarged section 44 can be opened and closed by telescoping over the fixed section 24. Both sections may be cylindrical and eccentric as seen in FIG. 4. When the first section 44 is opened the relative position of the sections as seen in FIG. 2 provides a significant gap indicated at 68 between the sections 44 and 46. This exposes the take-off 64 and part of the take-off 63. If access to the take-off 63 or the calibrating equipment 62 or die 18 is required, the enlarged section 46 is simply moved into the gap 68 to achieve the position seen in FIG. 3. With the motors 51 and 52 the two enlarged sections may be moved concurrently to the position seen in FIG. 3 exposing the die and equipment at the upstream end of the vacuum chamber as indicated by the gap 69.

Figure 5:
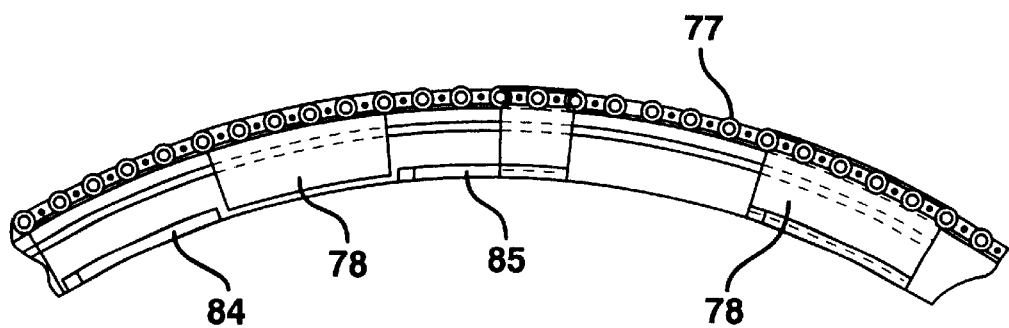
FIG. 5 is an enlarged fragmentary axial elevation of one form of lock.
Figure 6:
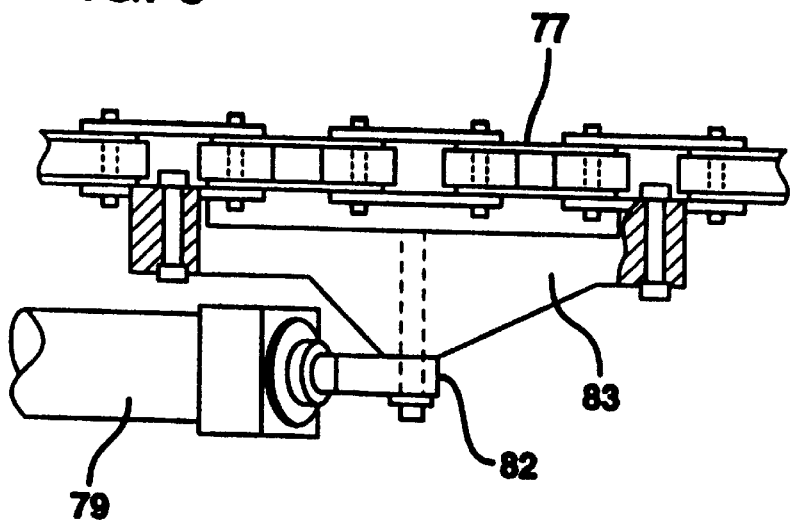
FIG. 6 is a fragmentary view of the lock of FIG. 5 actuator.
Figure 7:
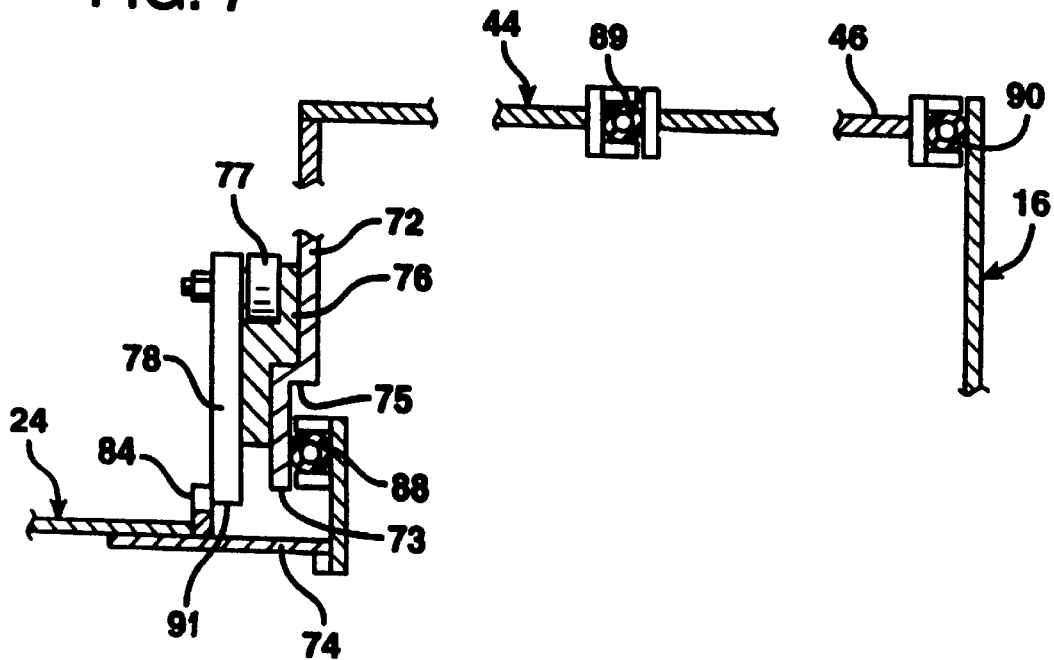
FIG. 7 is a fragmentary axial section from the fixed section to the fixed bulkhead showing the lock of FIG. 5 and the fluid actuated seals.

Referring now to FIGS. 4 through 7 it will be seen that the first section 44 has an end plate 72 forming an annular interior opening 73 through which the flanged ring 74 of the fixed section 24 extends. The plate in one form may be provided with an annular shoulder 75 supporting track ring 76 for roller chain 77 supporting locking plates 78. The roller chain may be moved around the track by a piston-cylinder actuator 79. The blind end of the cylinder is pivoted at 80 to the plate 72 while the rod end is pivoted at 82 to bracket 83 secured to the roller chain as seen in FIG. 6. As seen in comparing the right and left hand sides of FIG. 5, the reciprocation of the actuator will cause the locking plates to move from a clear position shown between a series of spaced projections 84 and 85 to a locking position behind such projections, and vice versa. The relative position of the locking plates and projections is seen in FIGS. 5 and 7. The projections are on the end of the fixed section. The locking plates are mounted on the roller chain on the end of the movable section. When the piston-cylinder assembly is actuated to obtain the clearance position, one or both of the large diameter movable sections may be moved selectively as shown in FIGS. 2 and 3.

The diameter of the bulkhead and movable sections may be substantial being on the order of fourteen feet (4.62 meters) or more, while the fixed section may be on the order of ten feet (3.05 meters). The enlargement ratio is thus on the order of about ten to about fourteen or more.

As seen in FIG. 7, in order to seal the larger diameter sections, an annular fluid expansible seal is provided at 88 between the fixed section 24 and the movable section 44. A similar annular fluid seal 89 is provided between the two large movable sections 44 and 46, while an annular fluid seal 90 is provided between the section 46 and the fixed bulkhead 16. With the locking plate 78 in the locking position behind the projections 84 and 85, the expansion of the seals 88, 89 and 90 will take up any clearance indicated at 92 seen in FIG. 7 providing a fixed abutment between the movable section and the fixed section 24. The expansion of the seals will then provide a sealed vacuum chamber. It is noted that when the vacuum chamber is open, the pond level 36 within the chamber is at the same level as the level 43 outside the chamber. With the chamber closed, the vacuum can quickly be restored.

Figure 8:
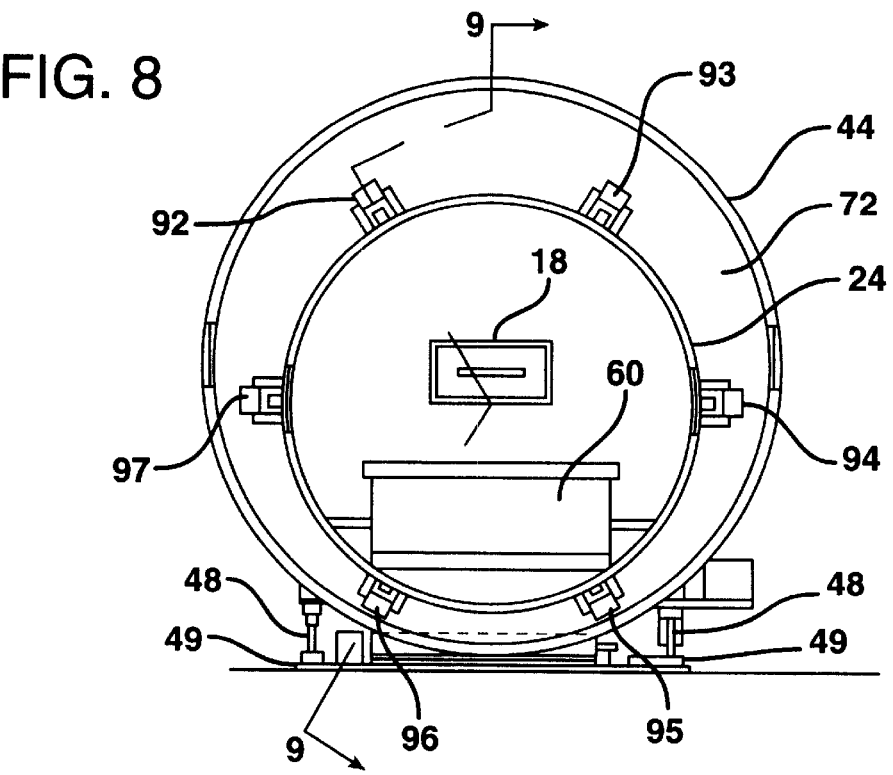
FIG. 8 is a view like FIG. 4 but illustrating the preferred lock system.
Figure 9:
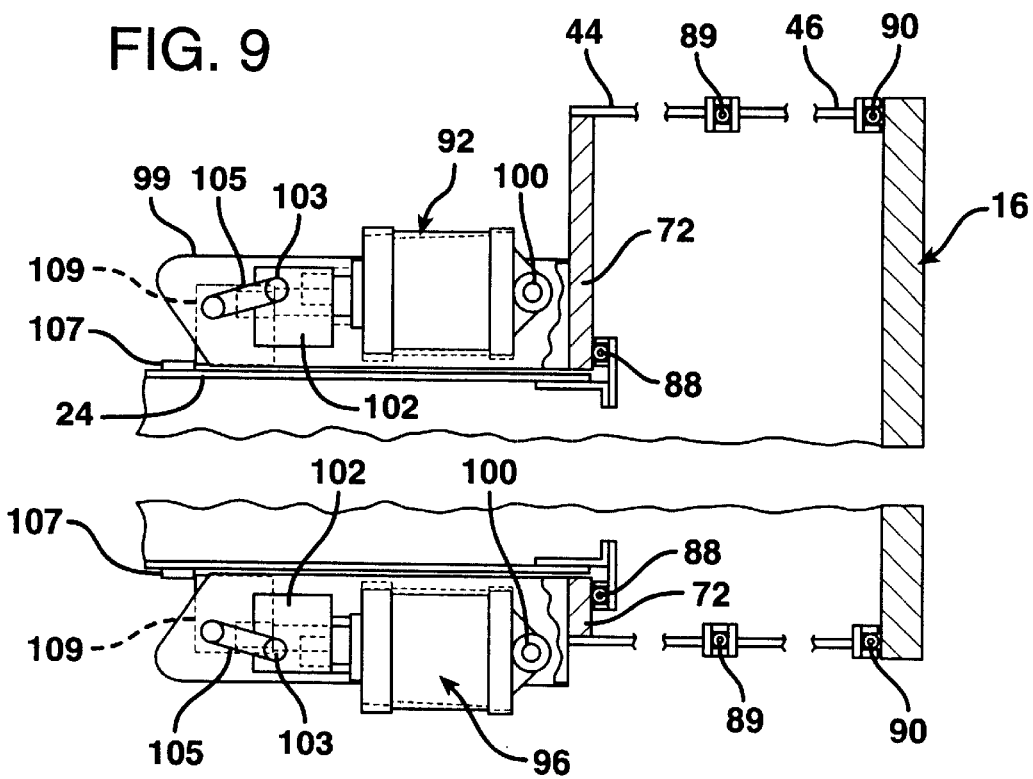
FIG. 9 is a fragmentary broken section of the lock system of FIG. 8 taken substantially on the line 9—9 of FIG. 8.

Referring now to FIGS. 8 and 9, there is illustrated a preferred locking system for the present invention whether the fixed and telescoping sections are of substantially different or similar sizes. The locking system utilizes pneumatic piston-cylinder assembly actuators shown at 92, 93, 94, 95, 96 and 97 in FIG. 8. The actuators are spaced equally 60° apart around the center of the fixed section symmetrically on each side of a vertical plane through the center.

The blind end of each actuator is pivoted between parallel plate brackets 99 at 100. The brackets extend from the plate 72. Each actuator rod has fixed thereto a lock block 102 which as a transverse follower rod 103, the projecting ends of which ride in cam slots 105 in each bracket plate. The slots are inclined with respect to the axes of the sections and move the lock blocks radially inwardly as the rods of the actuators extend and radially outwardly as the actuators retract. When retracted in the full line position shown, the blocks are radially clear of respective stop blocks 107 secured to the exterior of fixed section 24. When extended to the phantom line position 109, the lock blocks engage behind and abut against the stop blocks, preventing the opening or telescoping of the two sections 44 and 24.

The pressure within the cylinders 92 drives the two movable sections to the right as seen in FIG. 9, while pressure within the fluid seals 88, 89 and 90 is counteractive. The lock system of FIGS. 8 and 9 is preferred for its simplicity and short cycle of action. The system can be used whether the telescoping sections are of similar or dissimilar size.

It can now be seen that there is provided a vacuum extrusion system particularly useful for the production of low density foams with the vacuum chamber utilizing a fixed large diameter entrance bulkhead plate with first and second large diameter movable sections. The first section with the larger diameter is movable and seals against a second section, and telescopes over a smaller diameter fixed section which includes a dam forming part of a full immersion water baffle seal permitting the extrudate to exit the chamber. The second section may move within the gap created by movement of the first section and seals against the first section and an entrance bulkhead plate. A truss supporting the complex downstream equipment extends from the dam to the fixed bulkhead through the movable large diameter sections. In this manner all of the downstream equipment may quickly and conveniently be exposed with proper spatial environment for the operator and any errant extrudate. The vacuum chamber can quickly be restored and sealed after any problems are corrected. The volumetric and access capability is important on start up for large throughput extrusions.

To the accomplishment of the foregoing and related ends, the invention then comprises the features particularly pointed out in the claims, these being indicative, however, of but a few of the various ways in which the principles of the invention may be employed.

What is claimed is:

1. An extrusion method comprising the steps of forming an extrudate through a die in one end of a vacuum chamber, passing the extrudate through sizing and shaping equipment downstream of the die, and passing the extrudate through a water baffle immersion cooler at the opposite end of the chamber to enable the chamber to be maintained under vacuum as the extrudate continually exits to atmosphere, and providing the chamber with movable and sealable sections surrounding the die, sizing, and shaping equipment, and selectively moving said sections fully laterally to expose any of the die, sizing, and shaping equipment.

2. A method as set forth in claim 1 including the step of providing at least two movable sections, and a fixed section, at least one of said movable sections telescoping over said fixed section.

3. A method as set forth in claim 2 including the step of moving said movable sections concurrently or independently.

4. A method as set forth in claim 3 including the step of forming the moving and fixed sections as cylindrical sections with the movable sections being substantially larger than the fixed section.

5. A method as set forth in claim 4 including the step of forming the sections so that the diameter ration of the fixed section and movable sections is on the order of about 10 to about 14.

* * * * *